(12) United States Patent
Bouard et al.

(10) Patent No.: US 11,027,620 B2
(45) Date of Patent: Jun. 8, 2021

(54) METHOD AND SYSTEM FOR MONITORING CHARGING STATIONS

(71) Applicant: Bayerische Motoren Werke Aktiengesellschaft, Munich (DE)

(72) Inventors: Alexandre Bouard, Munich (DE); Roland Ember Mork, Munich (DE); Nicolai Kraemer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 292 days.

(21) Appl. No.: 15/828,545

(22) Filed: Dec. 1, 2017

(65) Prior Publication Data

US 2018/0086221 A1    Mar. 29, 2018

Related U.S. Application Data

(63) Continuation of application No. PCT/EP2016/062477, filed on Jun. 2, 2016.

(30) Foreign Application Priority Data

Jun. 3, 2015    (DE) .................... 10 2015 210 325.0

(51) Int. Cl.
*H02J 7/00*    (2006.01)
*B60L 53/14*    (2019.01)
(Continued)

(52) U.S. Cl.
CPC .......... *B60L 53/14* (2019.02); *B60L 11/1838* (2013.01); *B60L 53/66* (2019.02); *G06Q 10/02* (2013.01);
(Continued)

(58) Field of Classification Search
CPC ............................. Y02T 90/14; B60L 11/1838
(Continued)

(56) References Cited

U.S. PATENT DOCUMENTS 5,548,200 A * 8/1996 Nor ..................... B60L 11/184
    320/106
8,768,624 B2 * 7/2014 Kobayashi ............. G01C 21/34
    701/533

(Continued)

FOREIGN PATENT DOCUMENTS

CN        103155343 A     6/2013
CN        103358924 A    10/2013
(Continued)

OTHER PUBLICATIONS

International Search Report (PCT/ISA/210) issued in PCT Application No. PCT/EP2016/062477 dated Aug. 1, 2016 with English translation (seven pages).

(Continued)

*Primary Examiner* — Yalkew Fantu
(74) *Attorney, Agent, or Firm* — Crowell & Moring LLP

(57) ABSTRACT

A method is provided for determining a property of a charging station, wherein the charging station is designed to provide electrical energy for charging a vehicle. The method determines vehicle data, wherein the vehicle data were created by a first vehicle with respect to a charging operation of the first vehicle at the charging station. In addition, the method determines a property of the charging station on the basis of the vehicle data. Furthermore, the method provides data that indicate the determined property of the charging station.

12 Claims, 1 Drawing Sheet

(51) Int. Cl.
*G06Q 50/30* (2012.01)
*G06Q 50/06* (2012.01)
*G06Q 10/02* (2012.01)
*B60L 53/66* (2019.01)
*B60L 11/18* (2006.01)
*H01M 10/44* (2006.01)

(52) U.S. Cl.
CPC ............. *G06Q 50/06* (2013.01); *G06Q 50/30* (2013.01); *H01M 10/44* (2013.01)

(58) Field of Classification Search
USPC ........................................................ 320/109
See application file for complete search history.

(56) References Cited

U.S. PATENT DOCUMENTS

| | | | |
|---|---|---|---|
| 9,142,978 B2* | 9/2015 | Juhasz | H02J 7/0013 |
| 2009/0261779 A1* | 10/2009 | Zyren | G06Q 50/06 |
| | | | 320/109 |
| 2013/0131974 A1 | 5/2013 | Uyeki et al. | |
| 2013/0154561 A1* | 6/2013 | Gadh | H02J 1/14 |
| | | | 320/109 |
| 2014/0285146 A1* | 9/2014 | Huston | B60L 11/1816 |
| | | | 320/109 |
| 2014/0312839 A1* | 10/2014 | Uyeki | B60L 53/64 |
| | | | 320/109 |
| 2015/0039391 A1* | 2/2015 | Hershkovitz | G06Q 10/04 |
| | | | 705/7.31 |
| 2018/0012497 A1* | 1/2018 | Penilla | G05D 1/0011 |

FOREIGN PATENT DOCUMENTS

| | | |
|---|---|---|
| CN | 104113105 A | 10/2014 |
| DE | 10 2009 049 082 A1 | 4/2011 |
| DE | 10 2010 027 729 A1 | 10/2011 |
| DE | 11 2012 004 835 T2 | 9/2014 |
| DE | 10 2013 219 545 A1 | 4/2015 |
| EP | 2 792 538 A2 | 10/2014 |

OTHER PUBLICATIONS

German-language Written Opinion (PCT/ISA/237) issued in PCT Application No. PCT/EP2016/062477 dated Aug. 1, 2016 (five pages).

German-language Search Report issued in counterpart German Application No. 10 2015 210 325.0 dated Apr. 5, 2016 with partial English translation (13 pages).

Chinese Office Action issued in Chinese application No. 201680031899.0 dated Dec. 4, 2020, with English translation (Fourteen (14) pages).

* cited by examiner

METHOD AND SYSTEM FOR MONITORING CHARGING STATIONS

CROSS REFERENCE TO RELATED APPLICATIONS

This application is a continuation of PCT International Application No. PCT/EP2016/062477, filed Jun. 2, 2016, which claims priority under 35 U.S.C. § 119 from German Patent Application No. 10 2015 210 325.0, filed Jun. 3, 2015, the entire disclosures of which are herein expressly incorporated by reference.

BACKGROUND AND SUMMARY OF THE INVENTION

The invention relates to a method and a corresponding system for the automatic determination of properties of charging stations.

An important prerequisite for promoting the acceptance of vehicles with electric drives is the availability of a reliable network of charging stations, at which the vehicles can be recharged. Status information about the individual charging stations can be provided in a database in the form of points of interest (POIs). These POIs can be provided for a navigation device of a vehicle, for a smartphone application or a web page, and thus enable the driver of the vehicle to locate and drive to a suitable and available charging station when required.

Due to the relatively low density of charging stations, it is important that the status information (in particular properties) of a charging station provided in a POI are correct. For example, an incorrect specification in relation to available charging connectors, in relation to the available charging power, or in relation to the position of the charging station, etc., can lead to a charging operation of a vehicle not being carried out, and thus it is possible that the vehicle may no longer have sufficient electrical energy to reach another charging station. This can lead to dissatisfaction with the use of an electric vehicle.

This present application therefore deals with the technical object of providing a method and a corresponding system, by which properties of charging stations can be determined and/or verified automatically. In this way, it is possible to increase the probability that a vehicle can only approach such charging stations, at which a charging procedure can be performed.

This and other objects are achieved by a method for determining a property of a charging station in accordance with embodiments of the invention.

In accordance with one aspect, a method for determining a property of a charging station is described. The charging station is designed to provide electrical energy for charging a vehicle as part of a charging operation. The property of the charging station comprises, for example, a position of the charging station, in particular an address and/or GPS coordinates. Alternatively or additionally, the property of the charging station comprises an available charging power and/or charging voltage of the charging station. Furthermore, the property of the charging station can comprise an available charging mode of the charging station, in particular AC charging, DC charging, conductive charging via a charging cable and/or inductive charging. In addition, the property of the charging station can comprise an available charging connector type of the charging station and/or an operating status of the charging station. Furthermore, the property of the charging station can comprise an interoperability of the charging station, in particular in relation to a vehicle type. For example, the property can indicate that the charging station is designed in a validated way for charging vehicles of a certain vehicle type.

The method comprises determining vehicle data, wherein the vehicle data were created by a first vehicle with respect to a charging operation of the first vehicle at the charging station. The vehicle data can indicate one or a plurality of properties of the charging operation carried out at the charging station. On the basis of these one or more properties of the charging operation, conclusions can be drawn as to one or more properties of the charging station.

In particular, the first vehicle can be designed to create a vehicle data record for a charging operation, wherein the vehicle data record comprises information in relation to the charging operation. This vehicle data record can be transmitted to a system (or to a database) by the first vehicle. For example, the vehicle record can be transmitted to the system over a wireless communications network (for example GPRS, UMTS and/or LTE).

The vehicle data for a charging operation can indicate a position, in particular an address and/or GPS coordinates, at which the charging operation took place. The position of the charging operation can be determined by a GPS receiver and/or by a navigation device of the first vehicle. Alternatively or additionally, the vehicle data can display a charging power and/or charging voltage, with which the charging operation takes place. This information can be determined by a charge control device of the first vehicle. In addition, the vehicle data can display a charging mode, in particular AC charging, DC charging, conductive charging via a charging cable, inductive charging, with which the charging operation was carried out. In addition, the vehicle data can indicate a charging connector, via which the charging operation was carried out. In addition, a point in time and/or a period of time can be displayed, at or in which the charging operation takes place.

The vehicle data can be determined or detected autonomously by the first vehicle. In particular, the vehicle data can be determined independently of the charging station. An information source relating to one or more properties of the charging station can therefore be provided, which is independent of the charging station.

The method also comprises the determination of a property of the charging station on the basis of the vehicle data. For example, by means of a property of the completed charging operation indicated in the vehicle data, a direct conclusion can be drawn as to the corresponding property of the charging station. If, for example, the charging operation was completed with a specific charging power, then it can be directly concluded that the charging station is designed to provide this particular charging power. Thus, one or more properties of the charging station can be determined and/or verified in a reliable and automatic way.

In addition, the method can comprise the provision of data, which indicate the determined property of the charging station. In particular, so-called POI (Point Of Interest) data can be provided (e.g., for a navigation device of a second vehicle). The data, which indicate the determined property of the charging station, can include information that enables a navigation device of a second vehicle to determine whether the charging station is suitable for charging the second vehicle. To achieve this, one or more of the requirements for a charging operation for the second vehicle can be compared with one or more properties of the charging station. Furthermore, the data that indicate the determined property of the charging station (i.e. in particular, the POI data) can enable the navigation device of the second vehicle to determine a driving route to the charging station.

By consideration of vehicle data, reliable POI data on charging stations can be determined and deployed automatically. The result thereby achieved is that there is a greater likelihood that charging operations can be carried out.

The procedure can also comprise providing a data record for the charging station, wherein the data record indicates one or more properties of the charging station. The data record for the charging station can be provided, for example, by an operator of the charging station. The data record can then be updated or verified with the property determined on the basis of the vehicle data. The quality of the data contained in the data record can thus be increased. In particular, such a data record can be provided which indicates one or more verified properties (by vehicle data) of a charging station. Furthermore, the data record can indicate one or more non-verified properties of the charging station, if there are no vehicle data available yet on a charging operation that would enable a verification of the relevant property.

The method can further comprise matching one or more properties of the charging station which are indicated by the data record with data from a publicly accessible database. Examples of publicly-accessible databases are an address database and/or a digital map database. These enable, for example, a position of a charging station to be reviewed. By taking into account data from a publicly accessible database, the quality of POI data provided can continue to be improved.

As already stated, the vehicle data relating to a charging operation can be contained in a vehicle data record. The method can comprise sending the vehicle data record from the first vehicle to a system, which is designed to receive vehicle data records from a plurality of vehicles. The system can then evaluate the plurality of vehicle data records. In particular, a plurality of vehicle data records relating to a plurality of charging operations at the charging station can be determined. In addition, a property of the charging station can be determined on the basis of the plurality of vehicle data records. By taking into account a plurality of vehicle data records, the quality of determined POI data can continue to be improved.

The data which indicate the determined property of the charging station, i.e. in particular the POI data, can indicate a plurality of properties of the charging station. In this case, only a subset of the plurality of properties of the charging station may have been identified on the basis of the vehicle data. The method can comprise the provision of an index into the data provided (in particular in the POI data) indicating which of the plurality of properties of the charging station was determined on the basis of the vehicle data. On the other hand, it is also possible to indicate whether a certain property of the charging station has not been verified by vehicle data. This enables a navigation device of a vehicle to select a charging station, at which a successful charging operation can be carried out with a higher likelihood.

The method can also comprise determining station data, wherein the station data were created by the charging station with respect to the charging operation of the first vehicle at the charging station. In particular, the charging station can be designed to create a station data record for each charging operation (in a similar manner to a vehicle record, which is created by a vehicle for a charging operation). The property of the charging station can then also be determined on the basis of the station data. This allows the reliability of POI data to be increased further. The station data can be transmitted, for example, from the charging station to a database of an operator of the charging station. The station data of a charging station may be, if appropriate, aggregated with station data of other charging stations of the operator, to determine aggregated station data. The station data, or the aggregated station data, can then be transmitted from the operator's database to the system.

According to a further aspect, a system (which comprises, for example, a central database) is described, which is designed to implement the method described in this document.

According to a further aspect, a software (SW) program is described. The SW program can be designed to be executed on a processor, and thereby to execute the method described in this document.

According to a further aspect, a storage medium is described. The storage medium can comprise a SW program, which is designed to be executed on a processor and thereby to execute the method described in this document.

It is important to note that the methods, devices and systems described in this document can be used both alone and in combination with other methods, devices and systems described in this document. In addition, all aspects of the methods, device and systems described in this document can be combined with one another in a wide variety of ways.

Other objects, advantages and novel features of the present invention will become apparent from the following detailed description of one or more preferred embodiments when considered in conjunction with the accompanying drawings.

DETAILED DESCRIPTION OF THE DRAWINGS

As mentioned above, this document deals with the technical object of increasing the success rate of electrical charging operations in a reliable and efficient way. In this context, in particular, a system and a method are described, with which the properties of a charging station can be determined automatically and reliably. The determined properties of the charging station can then be made available to vehicles with an electric drive (e.g. as POIs), to enable the vehicles to determine suitable charging stations for a charging operation.

Figure 1:
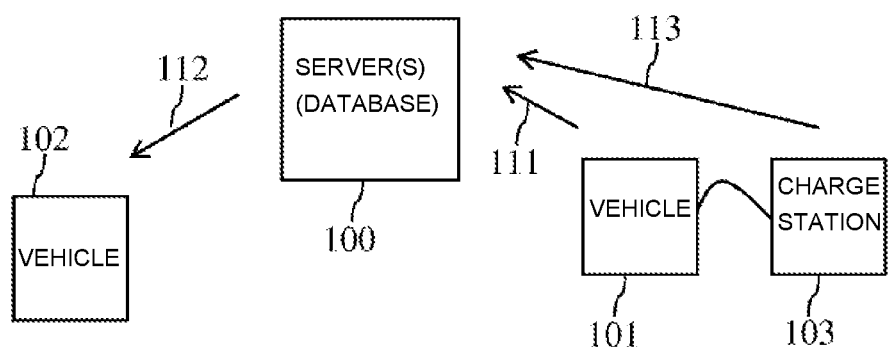
FIG. 1 an example of a system for determining status information in relation to a charging station.

FIG. 1 shows a charging station 103, which is designed to provide electrical energy for charging a vehicle 101, 102. The charging station 103 can be designed to send station data 113 to a system 100 (e.g., to a server with a central database). The station data 113 can comprise, for example, an identifier of the charging station 103, which enables the charging station 103 to be identified. On the basis of the identifier, for example, a data record of the charging station 103 can be accessed, wherein the data record contains stored information about one or more properties of the charging station 103. The one or more properties of the charging station 103 can include:

a position of the charging station 103(e.g. an address and/or GPS coordinates);

available charging powers and/or charging voltages of the charging station 103;

available charging modes (e.g. AC charging, DC charging, conductive charging via a charging cable, inductive charging, etc.) of the charging station 103;

available charging connectors of the charging station 103;

opening hours of the charging station 103;

an operating status of the charging station 103 (e.g. charging station 103 is available for charging operations, charging station 103 is occupied by an on-going charging operation, charging station 103 is defective, etc.) and/or available billing modes (cash payment, card payment, subscriptions, etc.).

The station data 113 can include information in relation to one or more of the above-mentioned properties. In particular, the station data 113 can indicate, for example, the current operating status of the charging station 103. In addition, the station data 113 can include information on a charging operation actually carried out (e.g. information that is used for calculating the cost of the charging operation).

Furthermore, FIG. 1 shows a first vehicle 101, which is connected to the charging station 103 for a charging operation. As part of a charging operation, a data communication can take place between the first vehicle 101 and the charging station 103, in order to initiate the charging operation. For this purpose, a data link (for example, wireless or wired) is set up between the first vehicle 101 and the charging station 103. Furthermore, a power connection (for example, wired or inductive) is set up between the first vehicle 101 and the charging station 103, to enable the transmission of electrical energy from the charging station 103 to the vehicle 101.

As part of the charging operation, a plurality of data can be determined by the first vehicle 101, which can be transmitted to the system 100 as vehicle data 111 for the charging operation. The vehicle data 111 may include:

a position (e.g. an address and/or GPS coordinates), at which the charging operation was carried out;

a charging power and/or a charging voltage, with which the charging operation was carried out;

a charging mode, (e.g. AC charging, DC charging, conductive charging via a charging cable, inductive charging, etc.), with which the charging operation was carried out;

a charging connector, by means of which the charging operation was carried out; and/or a point in time and/or a period of time, at or in which the charging operation was carried out.

The system 100 can be designed to determine the stored data record of the charging station 103 on the basis of the vehicle data 111. In particular, on the basis of the vehicle data 111 it is possible to determine the charging station 103 at which the charging operation was carried out. Typically, the vehicle data 111 do not include an identifier of the charging station 103. For example, as part of a charging operation in accordance with ISO/IEC 6185-1, there is no provision to transfer an identifier of a charging station 103 to a vehicle 101 to be charged. However, the system 100 can be designed to compare the position data of the charging operation included in the vehicle data 111 with the position data of the stored data records of available charging stations 103, to determine the data record of the charging station 103 at which the charging operation was carried out.

The system 100 can have a plurality of servers. In particular, the system 100 can include a station server, which is designed to receive the station data 113 from a plurality of charging stations 103. The station server can be operated by an operator of the charging stations 103. These station data 113 can be evaluated by the station server and, if necessary, aggregated. Then, evaluated and/or aggregated station data can be provided by the station server.

Alternatively or additionally, the system 100 can include a vehicle server, which is designed to receive the vehicle data 111 from a plurality of vehicles 101. The vehicle server can be operated, for example, by a manufacturer of the plurality of vehicles 101. The vehicle server can be designed to store and update the above data records for charging stations 103 of a plurality of different operators. To achieve this, in particular the vehicle data 111 can be evaluated (as described in this document). In addition, station data can be received and evaluated directly from a charging station 103 or indirectly via a station server.

The system 100 can also be designed to update or validate the data record of the charging station 103 on the basis of the vehicle data 111. In particular, the properties of the charging station 103 stored in the data record can be aligned with the vehicle data 111. For example, on the basis of the vehicle data 111, it can be determined that the charging station 103 is designed to provide a specific charging power, although this was not indicated in the data record. The properties stored in the data record can therefore be updated on the basis of the vehicle data 111. The fact that the vehicle data 111 were determined as part of an actual charging operation guarantees the determination of high-quality and reliable information about the properties of a charging station 103.

Information stored in the data record of a charging station 103 may be provided, in particular, as a POI (Point Of Interest). As shown in FIG. 1, the system 100 can be designed to provide POI data 112 regarding the charging station 103 to a second vehicle 102. The POI data 112 can be used, for example, in a navigation device of the second vehicle 102, to identify a suitable charging station 103 for charging the second vehicle 102. The POI data 112 for the charging station 103 can be determined on the basis of the data record of the charging station 103 stored in the system 100. In particular, the POI data 112 can indicate one or more of the above-mentioned properties of the charging station 103.

The vehicle data 111 for specific charging operations enable the properties of the charging station 103 to be identified and/or checked automatically and reliably. Thus, the reliability of POI data 112 of charging stations 103 and the likelihood of successful charging operations can be increased.

In particular, on the basis of the vehicle data 111, erroneous information (e.g. an incorrect position) about a charging station 103 can be detected and corrected as necessary. Furthermore, an automatic validation of charging stations 103 is possible. In addition, by the evaluation of vehicle data 111 from a plurality of charging operations, statistical data about the charging quality at a charging station 103 can be obtained and provided. By evaluation of the vehicle data 111, possible improvements in charging procedures and associated adaptations in a vehicle 101, or in a charging station 103, may also be identified.

Figure 2:
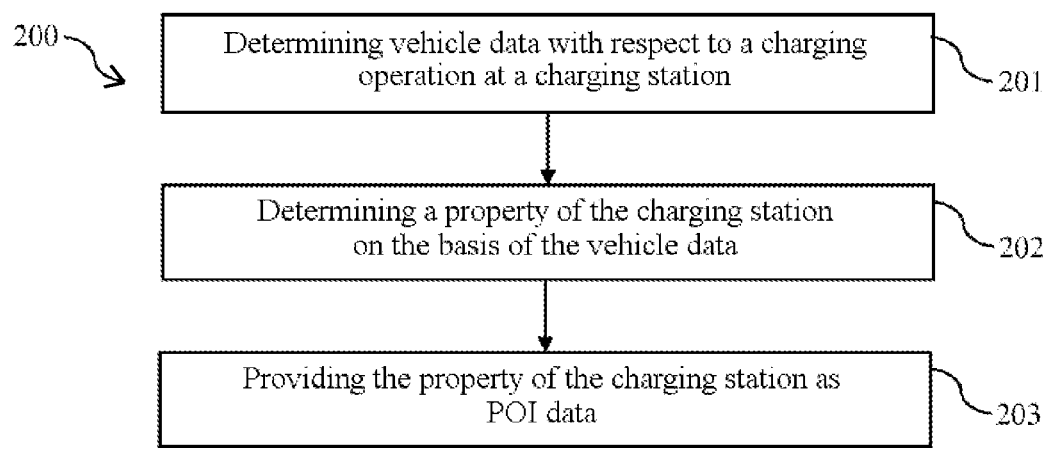
FIG. 2 a flow diagram of an example method for determining status information of a charging station.

FIG. 2 shows a flow diagram of an exemplary method 200 for determining a property of a charging station 103. The method 200 includes the determination 201 of vehicle data 111 by a first vehicle 101, wherein the vehicle data 111 include information about a charging operation of the first vehicle 101 at the charging station 103. The method 200 additionally includes the detection 202 of a property of the charging station 103 on the basis of the vehicle data 111. Furthermore, the method 200 includes the provision 203 of data (in particular POI data 112), which indicate the determined property of the charging station 103.

The consideration of vehicle data 111, which were created by a vehicle 101 for a specific charging operation, enables the identification and provision of reliable POI data 112 for charging stations 103. In addition, further sources of information relating to the properties of charging stations 103 can be taken into account. This allows the quality of the POI data 112 provided to be further increased.

For example, an operator of a charging station 103 can deploy a data record with (non-verified) properties of the charging station 103 on the system 100. The system 100 can be designed to verify one or more non-verified properties of the charging station 103. This enables, for example, the plausibility of the non-verified properties of the charging station 103 to be verified. For example, it is possible to verify whether a specified address of the charging station 103 matches the specified GPS coordinates of the charging station 103. For this purpose, other data sources (e.g. digital maps) can be accessed. Furthermore, it can be checked whether a specified address of the charging station 103 exists. In addition, data records relating to the charging station 103 in different POI databases can be reconciled.

By means of such a data reconciliation, data records for charging stations 103 can be determined, which may possibly include incorrect information in relation to one or more properties of the charging stations 103. In the POI data 112 provided for a charging station 103, it can be indicated whether or not a property of the charging station 103 has been verified using vehicle data 111 of actual charging operations. On the other hand, it can be indicated in the POI data 112 if there has been no verification of a property of the charging station 103. This means that a navigation device of a vehicle 102, which uses the POI data 112 for selecting a suitable charging station 103, can perform a risk assessment when selecting a suitable charging station 103. Overall, this can reduce the risk that a charging operation cannot be carried out on arriving at a charging station 103.

As a further source of data for determining and/or verifying a property of the charging station 103, data records relating to the billing of charging operations at the charging station 103 can be used. Typically, the charging station 103 and, if applicable, the first vehicle 101, creates a billing data record for each charging operation. The billing data record can be transmitted to the system 100, for example as station data 113. The billing data record can indicate the charging power of the charging operation, the charging mode of the charging operation, the time and/or duration of the charging operation, etc. The billing data record can therefore also be used for determining and/or verifying one or more properties of the charging station 103.

In sum, by taking into account a plurality of data sources, reliable and high-quality POI data 112 can therefore be provided for charging station 103. These make it possible for a navigation device of a vehicle 102 to select a charging station 103, at which there is a high likelihood that a successful charging operation can be performed. This allows the satisfaction of drivers of electric vehicles to be increased.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for determining a property of a charging station designed to provide electrical energy for charging a vehicle, the method comprising the acts of:

determining, at a first vehicle, vehicle data based on a charging operation of the first vehicle by the charging station, wherein the vehicle data characterizes the charging operation of the first vehicle by the charging station;

determining a property of the charging station based on the vehicle data; and providing data, which indicate the determined property of the charging station.

2. The method as claimed in claim 1, further comprising the acts of:

providing a data record for the charging station, wherein the data record indicates one or more properties of the charging station; and updating the data record with the identified property.

3. The method as claimed in claim 2, wherein the data record for the charging station is provided by an operator of the charging station; and the method further comprises the act of:

aligning one or more properties of the charging station, which are indicated by the data record, with data from a publicly accessible database.

4. The method as claimed in claim 1, wherein the data, which indicate the determined property of the charging station, comprise information which enable a navigation device of a second vehicle to:

determine whether the charging station is suitable for charging the second vehicle; and determine a driving distance to the charging station.

5. The method as claimed in claim 1, wherein the vehicle data with respect to the charging operation are contained in a vehicle data record; and the method further comprises the act of:

sending the vehicle data record from the first vehicle to a system, which is designed to receive vehicle records from a plurality of vehicles.

6. The method as claimed in claim 5, further comprising the acts of:

determining a plurality of vehicle data records with respect to a plurality of charging operations at the charging station; and determining the property of the charging station on the basis of the plurality of vehicle data records.

7. The method as claimed in claim 1, wherein the data, which indicate the determined property of the charging station, indicate a plurality of properties of the charging station;

wherein only a subset of the plurality of properties of the charging station is determined on the basis of the vehicle data; and wherein the method further comprises the act of:

providing an index into the data provided indicating which of the plurality of properties of the charging station was determined on the basis of the vehicle data.

8. The method as claimed in claim 1, wherein the property of the charging station comprises one or more of:

a position of the charging station, an available charging power of the charging station, an available charging voltage of the charging station, an available charging mode of the charging station, an available charging connector type of the charging station, an interoperability of the charging station, and an operating status of the charging station.

9. The method as claimed in claim 8,
wherein the position of the charging station is either or both of an address and GPS coordinates,
wherein the available charging mode is an AC charging, a DC charging, a conductive charging via a charging cable, or an inductive charging, and
wherein the interoperability of the charging station is based on a vehicle type.

10. The method as claimed in claim 8, wherein the vehicle data indicate one or more of the following properties of the charging operation:
- a position at which the charging operation was carried out;
- a charging power with which the charging operation was carried out;
- a charging voltage with which the charging operation was carried out;
- a charging mode, with which the charging operation was carried out;
- a charging connector, by which the charging operation was carried out; and
- a point in time and/or a period of time in which the charging operation was carried out.

11. The method as claimed in claim 10,
wherein the position is either or both of an address and GPS coordinates, and
wherein the charging mode is an AC charging, a DC charging, a conductive charging via a charging cable, and an inductive charging.

12. The method as claimed in claim 1, further comprising the act of:
determining station data, wherein the station data were created by the charging station with respect to the charging operation of the first vehicle at the charging station, wherein the property of the charging station is also determined on the basis of the station data.

* * * * *